March 27, 1956     E. J. SCHAEFER     2,740,058
SUBMERGIBLE MOTOR Filed Nov. 30, 1950     3 Sheets-Sheet 1

INVENTOR.
Edward J. Schaefer,
BY
Davis, Lindsey, Hibben + Noyes
Atty's.

March 27, 1956 E. J. SCHAEFER 2,740,058
SUBMERGIBLE MOTOR
Filed Nov. 30, 1950 3 Sheets-Sheet 2

Fig. 3.

INVENTOR.
Edward J. Schaefer,
BY
Davis, Lindsey, Hibben + Noyes
Atty's.

March 27, 1956

E. J. SCHAEFER 2,740,058

SUBMERGIBLE MOTOR

Filed Nov. 30, 1950

INVENTOR.
Edward J. Schaefer,
BY
Davis, Lindsey, Hibben & Noyes
Attys.

United States Patent Office 2,740,058
Patented Mar. 27, 1956

2,740,058

SUBMERGIBLE MOTOR

Edward John Schaefer, Fort Wayne, Ind.

Application November 30, 1950, Serial No. 198,332

19 Claims. (Cl. 310—87)

The invention relates generally to an electric motor for driving a pump, with the motor of the type adapted to operate while immersed in a liquid, and more particularly to a motor of this type, which is filled with oil.

In an oil filled motor, the liquid in which the motor is submerged must be prevented from entering the interior of the casing which houses the rotor and stator and, correspondingly, the oil in such casing must be prevented from leaking out of the casing. The only place where such action might occur would be at the point where the motor shaft extends from the casing for connection with the pump, and for this reason a sealing means is provided at this point. While under such conditions the seal is generally effective, there may be a very slight leakage which, if permitted to continue for any long period of time, would damage the motor.

The general object of the invention is, therefore, to provide a motor of the oil filled type, in which the oil within the motor is maintained at a pressure at least as high as, and preferably slightly higher than, the pressure of the liquid acting oppositely against the sealing means on the motor shaft.

Another object is to provide a motor of the oil filled type, in which the pressure of the liquid outside of the motor chamber and acting against the sealing means on the motor shaft is utilized in a novel manner to vary the pressure of the oil within the motor chamber and to maintain the latter equal to or slightly higher than the first-mentioned pressure.

A further object is to provide a motor of the oil filled type, in which a standard type of rotary seal may be used on the motor shaft, and in which the pressures applied to the seal are maintained in at least a balanced condition, and preferably with a slightly higher pressure on the oil, so that such seal is completely effective for its intended purpose.

Still another object is to provide a motor of the oil filled type, in which the alternate expansion of the oil due to heat generated by operation of the motor, and contraction due to cooling when the motor stops, is utilized in controlling the pressures applied to the sealing means.

A still further object is to provide a motor of the foregoing general character, which utilizes a mercury seal about the motor shaft, and which is provided with novel means for retaining the liquid mercury within the seal regardless of the position of the motor, whereby the motor may be turned on its side or in other position in handling it during shipment and installation without losing the mercury or having it become misplaced in the seal.

Other objects and advantages will become apparent from the following description, taken in connection with the accompanying drawings, in which.

In wells, it is frequently desirable to provide a motor which may be submerged in the liquid of the well so that the motor is closely connected to the pump for pumping the liquid therefrom. In motors of this character, the liquid in which the motor is submerged may be excluded from the interior of the motor so as to eliminate insulation difficulties that would be encountered if such liquid were permitted to enter the motor. For this reason, the motor is preferably filled with a high dielectric oil, which not only eliminates such insulation difficulties but also provides adequate lubrication for the bearings of the motor. The primary object in a motor of this type is, therefore, to provide means for preventing the oil from leaking out of the motor, particularly along the shaft thereof, and to keep the submerging liquid from entering the motor. This is particularly true in the case where the motor is submerged in water since, because of the difference in specific gravity, the water will tend to leak into the motor and thus replace some of the oil therein.

Generally, in motors of this type, standard rotary seals of one form or another may be employed about the motor shaft at the point where it emerges from the chamber within the casing structure where the stator and rotor of the motor are located. While such seals are highly effective in general machine construction where it is desired to prevent leakage of oil along a shaft, even very small leaks must be prevented in the case of a motor of this type since the cumulative effect of such leaks over a long period of time would become destructive. These seals may be of the well-known graphite or rubber gland type.

Motors of this type have heretofore been constructed, in which the motor shaft projects from the motor chamber in the casing through a seal chamber and thence to the pump for driving the latter. In such a seal chamber, it has been contemplated that one or two seals may be employed about the shaft, and if two are used one separates the seal chamber from the motor chamber and the other separates the seal chamber from the exterior of the motor. If slight leakage occurs through the last-mentioned seal, the pressure in the seal chamber will gradually increase until ultimately it may become equal to the pressure in the liquid outside of the motor due to the depth of submergence. If the oil within the motor chamber is under a pressure substantially less than the pressure in the liquid due to the depth of submergence, then initially the pressure in the seal chamber may be substantially that of the oil and, consequently, little, if any, leakage will occur through the seal separating the motor chamber from the seal chamber. However, should the other seal leak to a slight extent so that the pressure in the seal chamber would eventually reach that due to the depth of submergence, then the pressure differential on the first-mentioned seal is relatively large and leakage might occur therethrough. On the other hand, if the oil within the motor chamber were initially placed under a pressure equal to that due to the depth of submergence, then initially there would be a reverse pressure differential on the seal between the motor chamber and seal chamber which would tend to cause a leakage of oil from the motor chamber, and the pressure differential applied to the seal between the seal chamber and the motor chamber would only be reduced when considerable leakage had occurred through the other seal.

A motor embodying the features of the invention provides for variation of the pressure of the oil within the motor chamber under the influence of variations in pressure in the seal chamber. If these two pressures are maintained equal, then the seal between the motor chamber and seal chamber is not subjected to any pressure differential and leakage therethrough will be reduced to a minimum, regardless of the conditions that exist within the seal chamber due to leakage of the other seal separating the seal chamber from the exterior of the motor. Preferably, the oil in the motor chamber is maintained at a pressure slightly higher than any pressure that might occur within the seal chamber so that, in any event, no water can enter the motor chamber by leakage along the shaft.

In structure, motors of the type herein contemplated are usually made of elongated cylindrical form and of relatively small diameter, so that they may be inserted in the shaft leading to the well and so that they will thus occupy a relatively small portion of the well at the point where pumping occurs. Such a motor is usually supported by a pump located immediately above the motor and having a driving connection with the motor shaft, the pump in turn being carried by the well casing extending to the ground level.

Figure 1:
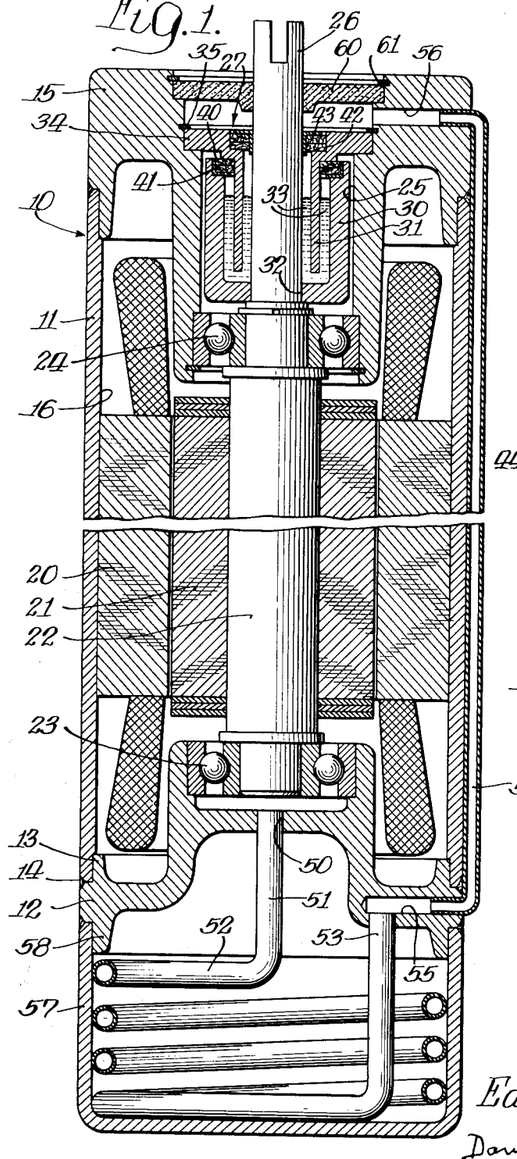
Figure 1 is a longitudinal sectional view of a motor embodying the features of the invention.

In Fig. 1 of the drawings, there is illustrated the preferred embodiment of the invention, in which the pressures in the motor chamber and the seal chamber are so correlated that leakage along the shaft is prevented. As shown in the drawings, this embodiment of the invention includes a casing structure, indicated generally at 10, and comprising a cylindrical casing or shell 11 of elongated form. At the lower end of the shell 11 there is mounted a bottom closure or partition 12 having a flange portion 13 fitting into the casing 11 to close the lower end thereof. To secure the bottom closure 12 to the shell, the two are illustrated as being welded to each other, as indicated at 14. At the upper end of the casing 11 is a cap structure or top closure 15 which, together with the bottom closure 12, forms a motor chamber 16 within the casing 11. Within the casing 11 the motor is mounted, the motor comprising a stator 20 and a rotor 21. The rotor is mounted on a shaft 22 projecting from the upper and lower ends thereof and rotatably supported in bearings 23 and 24 carried respectively by the bottom closure 12 and the top closure 15. The motor chamber is adapted to be filled with oil throughout the spaces in and around the motor.

Formed within the top closure 15 is a space, indicated at 25, through which a reduced end 26 on the motor shaft 22 extends, the upper end of the reduced extension 26 of the shaft being formed for coupling to the shaft of a pump (not shown). Within the space 25 there is provided a seal which separates the motor chamber 16 from a seal chamber in the upper part of the space 25. In the present instance, the seal about the shaft extension 26 could be of a standard type, but preferably is of a novel character particularly adapted for the conditions encountered and utilizing liquid mercury as the sealing means. Thus, the seal, indicated generally at 27, comprises a cup-shaped member 30 and a partition member 31, one of which members is secured to the reduced portion 26 of the shaft and the other of which is held stationary and secured in the top closure 15. In the present instance, the cup-shaped member 30 is secured to the shaft extension 26 with the latter extending through an aperture 32 in the bottom of the cup member. The side wall of the cup member thus extends upwardly along the shaft extension 26 in radially spaced relation thereto. The partition member 31 is in the form of an annular sleeve extending downwardly into the cup member 30 to form two annular concentric spaces therein, the inner annular space being located between the shaft extension 26 and the partition 31 and the outer annular space being located between the partition 31 and the side wall of the cup member 30. The partition member 31 terminates a short distance above the bottom wall of the cup member so that the two annular spaces are thereby in communication with each other in the bottom of the cup. The cup is adapted to be filled with mercury to a level well above the lower end of the partition so that the mercury fills the concentric annular spaces for a substantial portion of their length, as indicated at 33, and thus forms two columns of mercury.

The side wall of the cup member 30 has an outside diameter which is somewhat smaller than the internal diameter of the seal chamber in the upper part of the space 25 so that the oil with which the motor chamber is filled may also fill the space between the cup member 30 and the wall of the seal chamber and extend over the top edge of the cup member 30 to apply its pressure to the annular column of mercury in the space between the partition 31 and the cup member 30. The partition member 31 is herein shown as being supported by a flange 34 seated on an offset in the seal chamber and held in position therein by means of a locking ring 35. The flange 34 thus closes off the upper portion of the seal chamber from that portion in which the cup member 30 is located. The inner column of mercury in the annular space between the partition member 31 and the shaft extension 26 is adapted to be subjected to the pressure existing in the upper portion of the seal chamber. The mercury in the seal is thus subjected both to the pressure in the motor chamber and the pressure in the seal chamber, and any differential between such pressures will cause a difference in level in the mercury in the two annular spaces within the seal.

A motor of this type, of course, is designed to run when in a vertical position and if the motor were maintained in such a position at all times, the mercury would remain within the cup member 30. However, it is desirable to be able to place this mercury within the seal when the motor is assembled at the factory where it is built, and since, during shipment and installation, the motor may be turned on its side, the seal is provided with means to prevent the mercury from escaping from the cup member 30 regardless of the position of the motor. In the present instance, such means is shown as comprising closure means both between the cup member 30 and the partition member 31, and between the partition member 31 and the shaft extension 26, which will not prevent the mercury being subjected to the pressures in the motor chamber and the seal chamber but will prevent the mercury from running out of the cup member when the motor is tilted.

Figure 2:
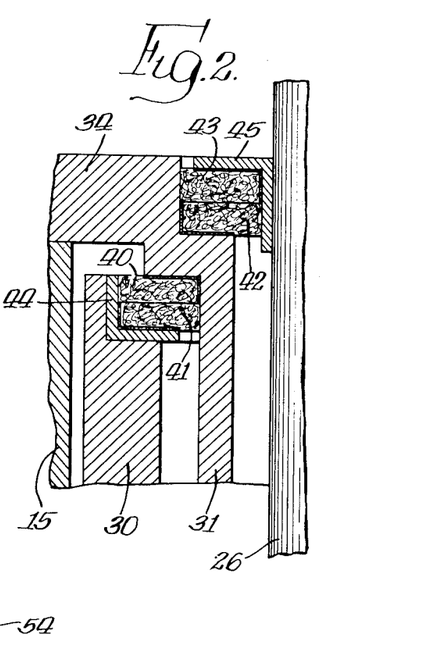
Fig. 2 is a fragmentary sectional view, on an enlarged scale, and showing a portion of the sealing means utilized on the motor shaft.

In the preferred form, such means comprises a pair of relatively rotatable felt washers 40 and 41 (see Figs. 1 and 2) closing the space between the cup member 30 and the partition member 31 at the upper edge of the cup member, and a similar pair of felt washers 42 and 43 closing the upper end of the space between the flange portion 34 and the shaft extension 26. As illustrated in Fig. 2, the felt washer 40 is cemented to a shoulder portion of the partition 31, while the felt washer 41 is cemented to a metal ferrule 44 mounted in the upper edge of the cup member 30. The washer 40 thus is held stationary while the washer 41 rotates with the cup member, and the two washers are in face-to-face engagement so that no mercury can escape over the upper edge of the cup member 30 from the annular space between the cup member and the partition member 31. The felt, however, permits the pressure existing in the motor chamber to be applied to the mercury in this space. Correspondingly, the felt washer 42 is cemented to the flange 34 of the cup member 31 while the felt washer 43 is cemented to a metal ferrule 45 mounted on the shaft extension 26. The washers 42 and 43 are in face-to-face engagement but, since the partition member 31 is held stationary and the shaft extension 26 rotates, the two washers 42 and 43 are relatively rotatable. The two washers 42 and 43 thus prevent spilling of the mercury from the annular space between the partition member 31 and the shaft extension 26 but permit the pressure in the upper portion of the seal chamber to be applied to the mercury within that space. The motor thus may be tilted on its side without danger of spilling the mercury out of the cup member 30.

As heretofore mentioned, the pressure of the oil within the motor chamber 16 is caused to vary under the influence of the pressure existing in the seal chamber, that is, the pressure in the upper part of the seal chamber above the flange 34. To this end, a connection is provided by which such pressure in the upper end of the seal chamber may be transmitted to the oil within the motor chamber. For this purpose, the bottom closure 12 is provided with a central aperture 50 into which the end 51 of a coiled tube 52 is fitted. The other end of the coiled tube 52, indicated at 53, is connected to and forms a part of a pressure transmitting tube 54 which communicates with the upper end of the seal chamber. Thus, the end 53 of the coiled tube 52 is also fitted into the bottom closure 12 at one side thereof to communicate with a lateral passage 55 formed in the bottom closure. The pressure transmitting tube 54 is likewise fitted into the passage 55 so that the tube 52 and tube 54 thus communicate with each other and, in effect, provide a single passage from the motor chamber. The upper end of the pressure transmitting tube 54 enters a radial passage 56 formed in the upper part of the top closure 15 and opening inwardly into the upper part of the seal chamber above the flange 34. The coiled tube 52 is preferably protected by a cap 57 fitting over and rigidly secured to a flange 58 formed on the lower face of the bottom closure 12.

The coiled tube 52 as well as the pressure transmitting tube 54 and the upper portion of the seal chamber above the flange 34 are all adapted to be filled with oil when the motor chamber 16 is so filled, so that pressure changes occurring in the upper portion of the seal chamber will thereby be transmitted and applied to the oil within the motor chamber. With oil filling the parts as just described, the oil in the motor chamber will thereby have the same pressure as exists in the upper part of the seal chamber so that both columns of mercury in the mercury seal will be subjected to the same pressure. The upper end of the seal chamber is adapted to be closed by a closure 60 which is made of a porous material such as porous graphite or metal for purposes hereinafter described. The closure 60 is adapted to be seated on an offset in the upper part of the seal chamber and held in place by a lock ring 61, the closure 60, of course, fitting snugly about the shaft extension 26 as illustrated in Fig. 1.

When the motor is first installed in a well, the pressure of the submerging liquid causes the oil in the upper part of the seal chamber to be increased in pressure because of the porous nature of the closure 60. This pressure is immediately transmitted through the pressure transmitting means comprising the tubes 54 and 52, to the motor chamber so that the pressure of the latter within the motor chamber immediately rises and conforms to the pressure existing in the seal chamber. Thus, even though there is a change in these pressures from what originally existed, the two pressures acting on the mercury seal remain equal so that there is no tendency for leakage therethrough.

When the motor is operated, heat is generated therein, which is transmitted to the oil within the motor chamber and causes an expansion of the latter. Such expansion, of course, causes an increase in pressure, not only in the motor chamber but through the tubes 52 and 54 to the upper portion of the seal chamber. When the pressure in the upper portion of the seal chamber is thus caused to exceed the pressure of the external liquid due to the depth of submergence, some of the oil is forced out through the porous closure 60. When the motor is stopped, the oil therein cools down, thereby tending to create a vacuum in the upper part of the seal chamber immediately under the porous closure 60. The space thus provided will immediately fill with liquid from the outside, entering such space through the porous closure 60. If the submerging liquid is water, which has a greater specific gravity than oil, it will tend to move to the lower part of the available space in the seal chamber as well as to enter the passage 56 and the tube 54, with the oil floating on top of such water so that the oil will be in contact with the under side of the porous closure 60.

The next time the motor is operated, the oil within the motor chamber again heats up and expands to drive out more of the oil and, when the motor again cools, the space thereby provided permits entrance of more water. Eventually, all of the oil in the upper part of the seal chamber as well as the oil in the passage 56, the pressure transmitting tube 54, the passage 55 and the end 53 of the coiled tube 52 will be driven therefrom and these parts will be filled with water down to the lowest point in the coiled tube 52. When that condition has been reached, later expansion of the oil within the motor chamber due to operation of the motor will merely force water upwardly and cause a discharge of some of the water that has theretofore entered through the porous closure 60. The oil remaining in the motor chamber and for the major portion of the coiled tube 52 will not be displaced by water since such oil, being of lower specific gravity than the water, will remain above the water in the lower end of the coiled tube 52. When that condition is reached, the pressure in the seal chamber is, of course, equal to the pressure due to the depth of submergence, and consequently this pressure is applied to the oil in the motor chamber and to the major portion of the coiled tube 52, so that the pressures exerted on the two columns of mercury in the mercury seal are varied one with the other to prevent any excessive pressure differential being applied to the mercury.

As heretofore mentioned, it is desirable to have a pressure existing in the motor chamber which is at least equal to the pressure existing in the seal chamber, and preferably the former pressure is slightly higher than the latter pressure. Such slightly higher pressure is attained in the present structure when, as just described, the upper portion of the seal chamber, the pressure transmitting tube 54 and the end portion 53 of the coiled tube 52 down to the lowest point therein are filled with water. To demonstrate how such higher pressure exists, the following formula expresses the mathematical relationship occurring under such condition:

$$h_c = l_m(g_w - g_o)$$

Where $h_c$ = pressure head in feet outward against the mercury seal.

$l_m$ = distance in feet from the mercury seal to the lowest point in the tube 54.

$g_w$ = the specific gravity of the water in which the motor is immersed.

$g_o$ = the specific gravity of the oil with which the motor chamber is filled.

Since the specific gravity of the oil, $g_o$, is lower than the specific gravity of the water, $g_w$, the pressure head, $h_c$, will have a positive value and, since the motor has an elongated form, the distance, $l_m$, may be quite substantial and the pressure head $h_c$ will be material. There will thus be a slightly higher pressure within the motor chamber applied against the mercury in the seal than the pressure in the seal chamber, which is also applied to the mercury. There will thus be no tendency for the water to leak through the seal since the pressure differential opposes any such leakage.

In the lower part of the coiled tube 52 there is, of course, an interface where the oil and water are in contact. At this point, some molecular diffusion of the two liquids may occur, but it is of only limited consequence since the area of such interface is small due to the diameter of the tube 52. In this respect, the coils of the tube 52 perform an important function in that they interpose a long path between the interface of the oil and water where diffusion might occur, so that the chances of any water reaching the motor chamber by such diffusion can be delayed for a long period of time, even permitting years of operation without having any difficulty from this score. In fact, the period of delay can be determined by properly determining the length of the tube 52. The coil 52 thus substantially prevents any of the submerging liquid in the tube from entering the motor chamber.

While the porous closure 60 performs as above described, it also has another very important function in controlling the pressures within the motor. Thus, if any very sudden change of pressure should occur in the upper portion of the seal chamber, which would impinge steep wave fronts of pressure on the exposed outlet or upper end of the pressure transmitting tube 54, there might be transient differentials of pressure which would cause surging of the mercury in the seal. These might be of such extent that they would tend to force curcury out of the cup member 30. The porous structure of the closure member 60, however, interposes a resistance to any such surge, which allows time for the pressure transmitting tube 54 to perform its function of transmitting the pressure of the seal chamber to the oil in the motor chamber. Excess pressure on the mercury in the seal from either direction is thereby avoided.

It will thus be noted that the pressure of the oil within the motor chamber 16 is at all times maintained at least equal to the pressure existing in the seal chamber, and sometimes is slightly higher than the latter pressure, so that there will be no tendency for any of the submerging liquid to leak through the seal into the motor chamber.

Figure 3:
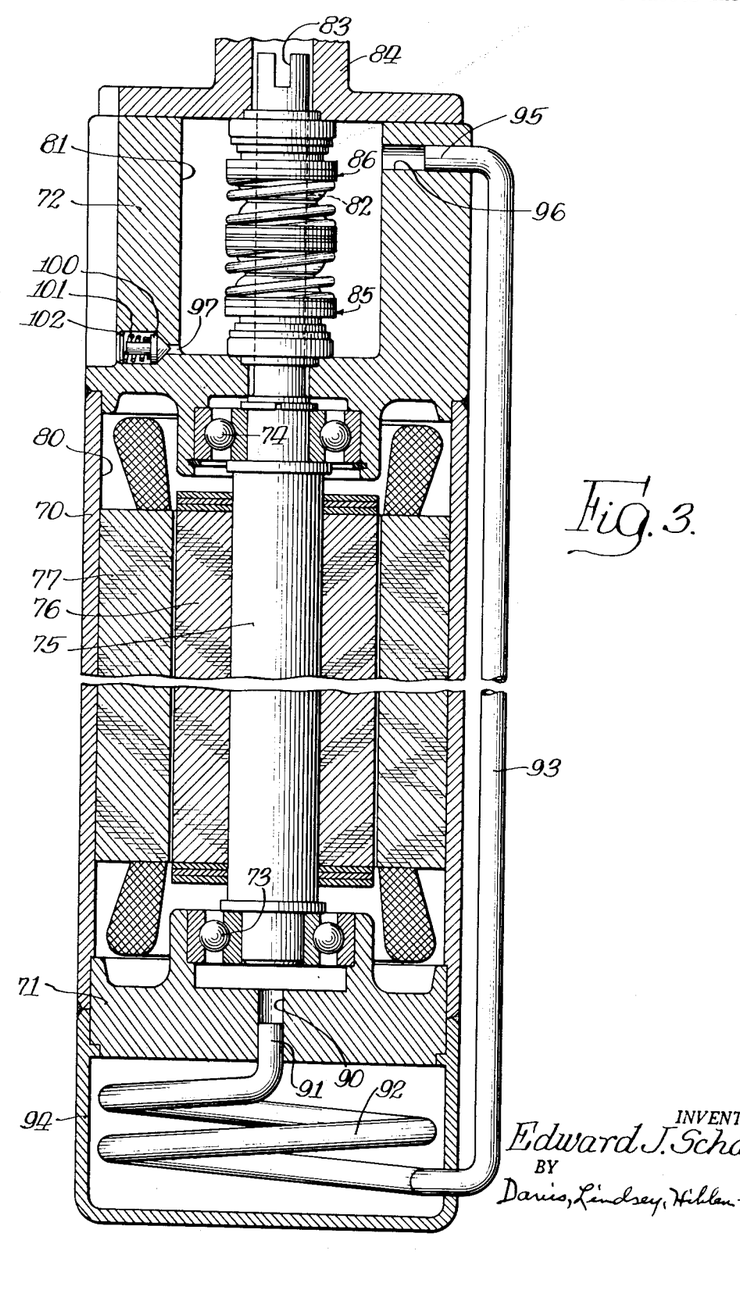
Fig. 3 is a longitudinal sectional view of a modified form of motor embodying the features of the invention.

In the embodiment of the invention shown in Fig. 3, the pressure of the oil within the motor chamber is automatically maintained equal to the pressure in the seal chamber at all times so that there is no pressure differential acting on the seal between the motor chamber and the seal chamber which might tend to cause leakage therethrough. In the illustrative form shown in Fig. 3, the motor comprises a casing structure comprising a cylindrical casing or shell 70 of an elongated form and having its lower end closed by a bottom closure 71 fitting within the lower end of the shell 70 and welded thereto. The upper end of the shell 70 is closed by a top closure 72 which correspondingly fits in the upper end of the shell and is welded thereto. The bottom and top closures 71 and 72 are provided with antifriction bearings 73 and 74 supporting a shaft 75 carrying a rotor 76 mounted within a stator 77 enclosed within the casing or shell 70. The bottom and top closures 71 and 72, together with the shell 70, form a motor chamber 80 within which the rotor 76 and stator 77 are mounted. This motor chamber, as in the case of the previously described form, is adapted to be filled with a high dielectric oil. The top closure 72 is provided with a pocket constituting a seal chamber 81 and through which a reduced end 82 of the shaft 75 extends. The upper end of the shaft extension 82 projects beyond the seal chamber 81 and is formed at its upper end for coupling with a pump, as indicated at 83, a portion of the pump housing being shown at 84. In this instance, the pump housing 84 serves to close the upper end of the seal chamber 81.

Within the seal chamber 81 there are mounted two shafts seals, indicated respectively at 85 and 86. These seals are of the standard rubber gland type having a graphite member in rotatable contact with a metallic member, the two members of each seal being respectively mounted on the shaft extension 82 and a stationary portion of the adjacent structure. In the present instance, the seal 85 is in the lower end of the seal chamber 81 and separates the seal chamber from the motor chamber, while the seal 86 is located in the upper end of the seal chamber 81 and separates the seal chamber from the exterior of the motor, in this instance from the pump. The seal chamber is thus isolated both from the motor chamber and from the exterior of the motor.

To maintain the pressure in the motor chamber and the pressure in the seal chamber the same, the bottom closure 71 is provided with a central aperture 90 into which extends the upper end 91 of a coiled portion 92 of a pressure transmitting tube 93. From the coiled portion 92, the tube 93 projects laterally through a cap member 94 secured on the bottom closure 91. Immediately outside of the cap member 94, the pressure transmitting tube 93 extends upwardly along the side of the casing and is bent inwardly at its upper end as at 95 to enter a radial passage 96 in the upper end of the top closure 72, the passage 96 thus communicating with the seal chamber 81. In addition to filling the motor chamber 80 with oil, the coiled portion 92 and the upwardly extending portion 93 of the pressure transmitting tube as well as the seal chamber 81 are initially adapted to be filled with oil. Thus, whatever pressure exists in the seal chamber 81 will be applied by the oil in the pressure transmitting tube 93 to the motor chamber through the aperture 90 opening into the lower end of the motor chamber.

The first time the motor is operated, the heat generated thereby causes an expansion of the oil in the motor chamber and seal chamber, and when such pressure becomes slightly higher than that of the pressure in the submerging liquid outside of the motor, some of the oil is adapted to be released. To this end, the seal chamber 81 is provided with a small outlet passage 97 extending laterally from the lower end of the seal chamber. The passage 97 is controlled by a pressure release valve 100 urged into closing relation with the passage 97 by a spring 101 bearing at one end against the head of the valve 100 and held in place at its other end by peening over a portion of the metal of the top closure, as indicated at 102.

When the pressure of the oil in the seal chamber becomes equal to the pressure due to the depth of submergence, plus the pressure exerted by the spring 101 the valve 100 will be forced open to permit passage therethrough of a small quantity of oil, thus relieving the pressure within the seal chamber 81. When this pressure falls below the pressure due to the depth of submergence and the force exerted by the spring 101, the spring, of course, will close the valve 100. When the motor cools down, the oil will contract and a slight vacuum will be created in the pressure chamber 81. However, at this time the pressure on the oil within the motor chamber 80 will be equilized with the pressure existing in the seal chamber because of the pressure transmitting tube 93.

If, at this time, the upper seal 86 is completely effective, no water from the exterior of the motor will enter the seal chamber around the shaft extension 82. However, the upper seal 86 is, under these conditions, subjected at one side to a pressure due to the depth of submergence from the exterior of the motor and is subjected at its other side to a slight vacuum within the seal chamber 81. There is thus quite a pressure differential acting on the upper seal 86 so that a slight leakage may occur. When the submerging liquid is water, any leakage thereof through the seal 86 will immediately descend to the lower part of the seal chamber 81 because the specific gravity of the oil therein is less than that of water, and accordingly the water will go to the bottom portion of the seal chamber.

The next time the motor is operated and is heated, the expansion of the oil within the motor chamber and the pressure transmitting tube 93, together with the expansion of any oil remaining in the seal chamber 81, will cause an increase in pressure, as heretofore mentioned, and since the water leaking in through the upper seal 86 occupies the lower portion of the seal chamber, such water will be forced outwardly past the valve 100. Thus, whenever water leaks into seal chamber 81, it will be discharged therefrom the next time that the motor is operated. For this reason, the passage 97 with the valve 100 is placed in the lower part of the seal chamber. With this arrangement, it is evident that the oil in the motor chamber is at all times maintained at the same pressure as exists in the seal chamber. If, during the time when the motor is cool, the seal chamber is below the pressure due to the depth of submergence, then correspondingly the oil within the motor chamber is at such lower pressure. When the pressure within the seal chamber is increased due to expansion from heat, correspondingly the pressure of the oil in the motor chamber is maintained at an equal level. The lower seal 85 thus is never subjected to any pressure differential so that no leakage can occur therethrough.

Should, by some chance, the seal chamber 81 become completely filled with water due to leakage through the seal 86, the contact of such water with the oil in the upper end of the tube 93 or the passage 96 is limited to the small area of such tube or passage so that very little water contamination of the oil therein will occur. Moreover, a long path is provided from such interfacial point of contact of oil and water by means of the vertically extending portion of the tube 93 and the coiled portion 92, so that the molecular diffusion of the water into the oil will never reach the motor chamber. Furthermore, the diameter of the tube 93 can be made small enough to prevent drops of water from passing through the oil within the tube so that the water can be prevented from ever reaching the lower end of the tube 93. It has been found that if the tube 93 has a diameter less than about 1/8 of an inch, for all practical purposes, the water will be prevented from entering this tube.

Figure 4:
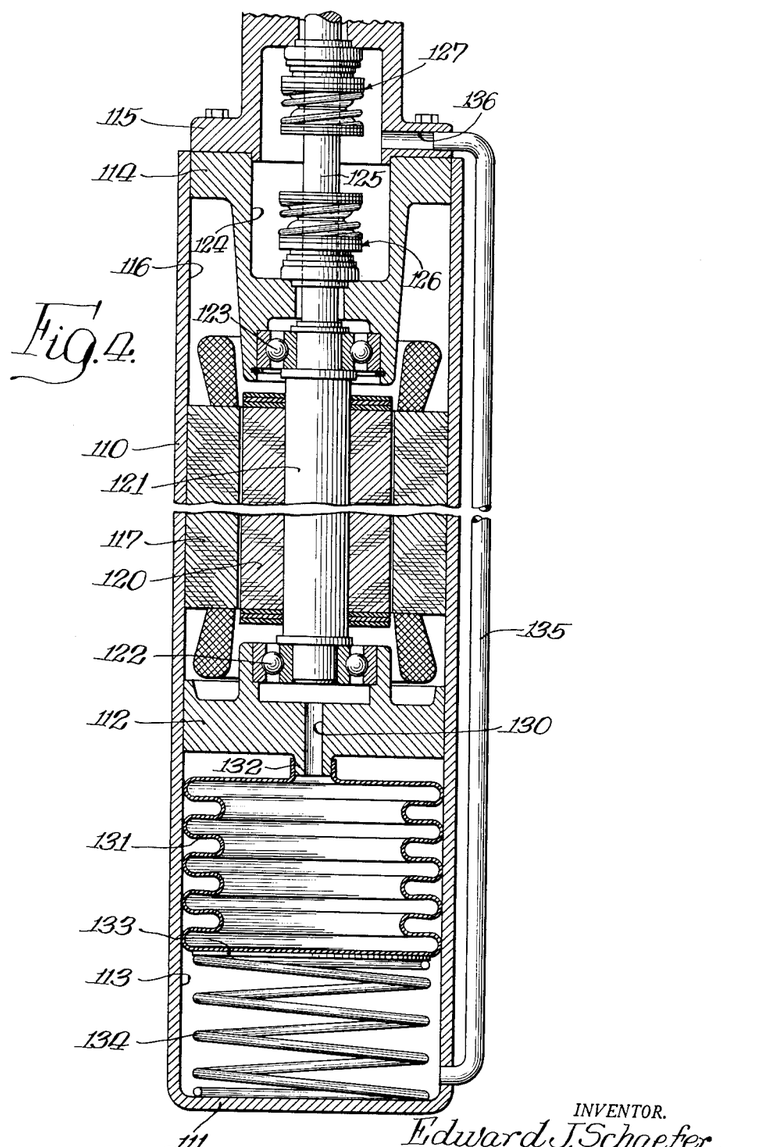
Fig. 4 is a longitudinal sectional view of another modified form of motor.

In the form of motor shown in Fig. 4, the casing structure comprises a cylindrical casing or shell 110 having its lower end closed, as by a transverse bottom wall 111 formed integrally with the shell 110. Intermediate the ends of the shell 110 is a transverse partition member 112 which provides a space within the lower end of the shell 110 constituting a pressure chamber 113. The upper end of the shell is closed by means comprising a top closure member 114, to which is attached a portion of the pump casing, indicated at 115. The space within the shell 110 between the partition member 112 and the top closure member 114 constitutes a motor chamber 116. Within the motor chamber 116 is mounted a stator 117 and a rotor 120 mounted on a shaft 121. The shaft 121 is supported in bearings 122 and 123 respectively mounted in the partition member 112 and the top closure member 114.

The top closure member 114 and the pump casing 115 are both provided with pockets opening into each other and constituting a seal chamber 124. The shaft 121 has an upwardly extending portion 125 of reduced diameter which projects into the pump casing 115 to drive the pump. Mounted about the shaft extension 125 are a pair of seals, indicated generally at 126 and 127, the seal 126 being mounted in the lower part of the seal chamber 124 and separating the seal chamber from the motor chamber 116, while the seal 127 is mounted in the upper portion of the seal chamber and separates the latter from the pump and thus from the exterior of the motor. The seals 126 and 127 are herein illustrated as being of the standard rubber gland type having a graphite surface rotatable relative to a metal surface.

The motor chamber 116 is adapted to be filled with oil and also to communicate with a pressure responsive element subjected to the pressure of such oil. In the illustrated construction, the partition member 112 at the lower end of the motor chamber 116 is provided with a central aperture 130 communicating with the interior of a bellows 131 constituting the pressure responsive element. The bellows 131 is of a standard type and may be made of rubber or of thin metal and is here illustrated as attached to a small hub portion 132 formed on the bottom of the partition member 112 through which the central aperture 130 extends. The bellows 131 is thus located in the pressure chamber 113 and is provided at its lower end with a pressure plate 133 against which a spiral compression spring 134 bears, the spring 134 being seated on the bottom wall 111 of the casing shell. The pressure of the spring 134 thus opposes the pressure of the oil within the bellows and motor chamber and exerts on such oil a predetermined pressure. Under the varying conditions that may occur within the motor during operation, the variations in expansion and contraction of the bellows 131 are relatively slight, so that the spring 134 exerts a substantially constant pressure on the bellows at all times.

The space within the pressure chamber 113 exteriorly of the bellows 131 is connected by means of a pressure transmitting tube 135 extending upwardly along the side of the shell 110 and in communication with the seal chamber 124 by means of a radial passage 136 which is here illustrated as being formed in the pump casing 115. Thus, whatever pressure exists within the seal chamber 124 will be applied through the pressure tube 135 to the pressure chamber 113 and will tend to compress the bellows 131. Such pressure, therefore, is augmented by the pressure exerted by the spring 134 and works in opposition to the pressure of the oil within the motor chamber and the bellows. The pressure of the oil within the motor chamber is thus substantially equal to the pressure existing in the seal chamber 124 plus the pressure exerted by the spring 134. The pressure exerted by the spring can be held to any desired value and the pressure on the oil within the motor chamber is thus slightly higher than the pressure existing within the seal chamber 124. Consequently, there is a predetermined pressure differential acting outwardly on the seal 126 so that even though water may leak into the seal chamber 124 through the upper seal 127, there will be no tendency for such water to enter the motor chamber by leakage through the seal 126.

If any water does leak through the upper seal 127 and by the accumulation of leakage eventually causes a pressure to exist within the seal chamber, which is equal to that due to the depth of submergence, such pressure is transmitted through the tube 135 to the pressure chamber 113. This pressure, therefore, acts on the bellows 131 to place the oil within the motor chamber under increased pressure so that at all times the pressure of the oil within the motor chamber is higher than that existing in the seal chamber by an amount equal to the pressure exerted by the spring 134.

With all of the foregoing structures, the oil within the motor chamber is maintained at a pressure which is at least equal to the pressure existing in the seal chamber and, in some instances, is slightly higher than the last-mentioned pressure. The seal separating the seal chamber from the motor chamber is thus never subjected to a large pressure differential and whatever pressure differential exists is in a direction tending to force the oil outwardly through such seal. Any water or other submerging liquid is thus prevented from entering the motor chamber under all conditions of operation.

I claim:

1. A submergible motor comprising a casing in the form of a cylindrical shell having its axis vertical, a partition within the shell adjacent the lower end thereof, a cap structure at the upper end of the shell forming with said partition of motor chamber within the shell adapted to be filled with oil, said cap structure having a seal chamber therein, a stator and a rotor mounted within said motor chamber, a drive shaft extending from said motor chamber through said seal chamber, a seal about said shaft in said cap structure for separating said chambers, and a pressure transmitting tube extending vertically along the side of said shell and having its upper end connected to said seal chamber, the lower end of said tube extending into said shell below said motor chamber and having a coiled portion within said shell connected to the motor chamber through an aperture in said partition at the lower end of the motor chamber, said tube transmitting the pressure of said seal chamber to said motor chamber to maintain the pressure therein at least equal to the pressure in the seal chamber, the coiled portion of the tube and the connection thereof with the lower end of the motor chamber trapping the oil within the motor chamber.

2. A submergible motor comprising a casing structure having a motor chamber adapted to be filled with oil and a seal chamber located above the motor chamber, a stator and a rotor mounted in said motor chamber, a drive shaft extending from said motor chamber through said seal chamber, a seal mounted on said shaft and separating said chambers, and a pressure transmitting tube connected at one end to said seal chamber and at its other end to the motor chamber for transmitting the pressure in said seal chamber to the oil in the motor chamber whereby the pressure in the motor chamber is maintained at least equal to the pressure in the seal chamber, said tube having a coiled portion below said motor chamber, whereby any water leaking into said seal chamber and into said tube will have a relatively small interface with the oil to minimize molecular diffusion of the water in the oil and contamination of the oil in the motor chamber by such diffusion is delayed.

3. A submergible motor comprising a casing structure having a motor chamber adapted to be filled with oil and a seal chamber, a stator and a rotor mounted within said motor chamber, a drive shaft extending from said motor chamber through said seal chamber, a mercury seal in said casing structure about said shaft and separating said seal chamber from said motor chamber, the mercury therein being subjected to the pressures existing in said motor chamber and said seal chamber, a porous closure for said seal chamber for maintaining the pressure in the seal chamber substantially equal to the pressure due to the depth of submergence, and a pressure transmitting tube connecting said seal chamber and said motor chamber for maintaining the pressure in the latter at least equal to the pressure in said seal chamber.

4. A submergible motor comprising a casing structure having a motor chamber adapted to be filled with oil and a seal chamber positioned above said motor chamber, a stator and a rotor mounted within said motor chamber, a drive shaft extending from said motor chamber upwardly through said seal chamber, a mercury seal mounted in said casing structure about said shaft and separating said chambers with the mercury therein subjected to the pressures in the respective chambers, a porous closure for the upper end of said seal chamber for maintaining the pressure therein substantially equal to the pressure due to the depth of submergence, and a pressure transmitting tube connected to the seal chamber adjacent the upper end thereof and to said motor chamber for maintaining the pressure in the latter at least equal to the pressure in said seal chamber.

5. A submergible motor comprising a casing structure having a motor chamber adapted to be filled with oil and a seal chamber positioned above said motor chamber, a stator and a rotor mounted within said motor chamber, a drive shaft extending from said motor chamber upwardly through said seal chamber, a seal mounted in the lower end of said seal chamber about said shaft and separating said chambers, a porous closure for the upper end of said seal chamber for maintaining the pressure therein substantially equal to the pressure due to the depth of submergence, and a pressure transmitting tube connected to the seal chamber adjacent the upper end thereof and to the lower end of said motor chamber for maintaining the pressure in the latter at least equal to the pressure in said seal chamber.

6. A submergible motor comprising a casing structure having a motor chamber and a seal chamber positioned above said motor chamber, a stator and a rotor mounted within said motor chamber, a drive shaft extending from said motor upwardly through said seal chamber, a seal mounted in the lower end of said seal chamber about said shaft and separating said chambers, a pressure transmitting tube connected to the seal chamber adjacent the upper end thereof and extending downwardly below said motor chamber and thence upwardly for connection with the lower end of said motor chamber, said chambers and said tube being adapted to be initially filled with oil, and a porous closure for the upper end of said seal chamber for subjecting the oil initially therein to the pressure due to the depth of submergence with said tube transmitting said pressure to the oil in the motor chamber, the alternate expansion and contraction of the oil due to operation of the motor and stopping thereof forcing oil first from said seal chamber through said closure and then from the downwardly extending portion of said tube to replace such oil with the submerging liquid, whereby the oil remaining in the motor chamber will be subjected to the pressure due to the depth of submergence plus the additional pressure due to the difference in specific gravity of the oil and said liquid multiplied by the length of the downwardly extending portion of said tube.

7. A submergible motor comprising a cylindrical casing, a bottom closure secured to the lower end of said casing, a top closure secured to the upper end of said casing and forming with said bottom closure a motor chamber within said casing adapted to be filled with oil, said top closure having a seal chamber therein, a stator and a rotor mounted in said motor chamber, a drive shaft extending from said motor chamber through said seal chamber, a seal mounted about said shaft and separating said chambers, a porous closure for said seal chamber, a pressure transmitting tube connected at one end to said seal chamber and at its other end to a passage in said bottom closure, a coiled tube located below said bottom closure and having one end communicating with the motor chamber through said bottom closure and its other connected to said passage for communication with said pressure transmitting tube, and a cap enclosing said coiled tube.

8. A submergible motor comprising a casing structure having a motor chamber adapted to be filled with oil and a seal chamber, a stator and a rotor mounted within said motor chamber, a drive shaft extending from said motor chamber through said seal chamber, a mercury seal in said casing structure about said shaft and separating said seal chamber from said motor chamber, the mercury therein being subjected to the pressure existing in said motor chamber and said seal chamber, a pressure transmitting tube connecting said seal chamber with said motor chamber for applying the pressure in said seal chamber to the oil in the motor chamber, and means separating said seal chamber from the exterior of the motor, said means comprising a porous member permitting discharge of oil from the seal chamber and entrance of submerging liquid therethrough at a slow rate and preventing sudden change of pressure in the seal chamber due to changes in pressure of the submerging liquid, said tube thereby having time to transmit changes in pressure in the seal chamber to the oil in the motor chamber to prevent excessive pressure differentials being applied to the mercury in said seal.

9. A submergible motor comprising a casing structure having a motor chamber and seal chamber positioned above said motor chamber, a stator and a rotor mounted within said motor chamber, a drive shaft extending from said motor chamber upwardly through said seal chamber, a pressure transmitting tube connected to said seal chamber and to said motor chamber for applying the pressure of said chamber to said motor chamber, and a seal mounted about said shaft and separating said chambers, said seal comprising a cup member containing mercury, an annular partition member extending into said cup member for separating the interior thereof into a pair of concentric annular spaces communicating with each other at the bottom of the cup with the mercury extending into said annular spaces, one of said members being secured to said shaft and the other member being secured to said casing structure, said annular spaces being respectively subjected to the pressures in said motor chamber and in said seal chamber, and a pair of relatively rotatable felt washers closing each of said annular spaces to prevent spilling of mercury in the event the motor is tilted.

10. In a submergible motor having a drive shaft projecting vertically from a motor chamber formed within the casing structure of the motor, a seal for closing said motor chamber comprising a cup-shaped member rigidly secured to the drive shaft with the latter projecting upwardly therethrough, a separator comprising a sleeve extending downwardly into the cup in radially spaced relation to the shaft and to the side wall of the cup to provide a pair of concentric annular spaces communicating with each other in the bottom of the cup and adapted to contain a quantity of mercury, said sleeve at its upper end having a radially extending supporting flange rigidly secured to the casing structure, a pair of felt washers in face-to-face relation and closing the upper end of the outer annular space, one of said washers being secured to said cup and the other to said sleeve, and a second pair of felt washers in face-to-face relation and closing the upper end of the inner annular space, one of said second pair of washers being secured to said sleeve and the other to said drive shaft, said pairs of washers preventing the mercury from spilling in the event the motor is tilted during shipment or installation.

11. A motor adapted to be submerged in water and comprising a casing structure having a motor chamber adapted to be filled with oil and a seal chamber above said motor chamber, a stator and a rotor mounted within said motor chamber, a drive shaft extending upwardly through said seal chamber, a seal mounted about said shaft and separating said chambers, and means to maintain the pressure of the oil in the motor chamber slightly higher than the pressure in said seal chamber to maintain a slight pressure differential on said seal, said means comprising a tube communicating with said seal chamber and extending downwardly below said motor chamber and thence upwardly for connection with the lower end of the motor chamber, and means to admit water into said seal chamber and to the portion of said tube extending from said seal chamber to the lowest point in said tube, whereby a pressure difference between said chambers is provided by the difference in specific gravity of said oil and water.

12. A submergible motor comprising casing structure providing a motor chamber closed to the exterior of the motor and adapted to be filled with oil and a seal chamber, a stator and a rotor mounted in said motor chamber, a drive shaft extending from said rotor through said seal chamber, a seal about said shaft separating said chambers, a pressure transmitting tube connected to said seal chamber for applying the pressure in said seal chamber to the oil in the motor chamber, thereby maintaining the pressure of the oil at least equal to the pressure in said seal chamber to prevent leakage through said seal, and means in the lower end of said casing structure and interposed between the lowest part of said tube and said motor chamber, said means comprising a trap above the lowest part of said tube of small cross sectional area with respect to the cross sectional area of the motor chamber and of extended length for at least substantially preventing the submerging liquid in said tube from entering the motor chamber from said tube.

13. A submergible motor comprising casing structure providing a motor chamber closed to the exterior of the motor and adapted to be filled with oil and a seal chamber, a stator and a rotor mounted in said motor chamber, a drive shaft extending from said rotor through said seal chamber, a seal about said shaft separating said chambers and subjected at its respective sides to the pressure of said oil and the pressure in said seal chamber, a pressure transmitting means providing a passage extending from said seal chamber for varying the pressure exerted by the oil on said seal in accordance with the pressure on said seal at the opposite side thereof, whereby the pressure of the oil is maintained at least equal to the pressure at said opposite side, means in the lowest part of the casing structure and interposed between the lowest part of said pressure transmitting means and said motor chamber comprising a trap above the lowest part of said pressure transmitting means of small cross-sectional area with respect to the cross-sectional area of the motor chamber and of extended length for at least substantially preventing the submerging liquid from entering said motor chamber from said pressure transmitting means.

14. A submergible motor comprising casing structure having a motor chamber closed to the exterior of the motor and adapted to be filled with oil initially at a pressure substantially below the pressure of the submerging liquid due to the depth of submergence, said casing structure also having a seal chamber adjacent said motor chamber and adapted initially to be filled with oil, a stator and a rotor mounted in said motor chamber, a drive shaft extending from said motor chamber through said seal chamber, a seal about said shaft separating said chambers, means providing a pressure transmitting passage connected at one end to said seal chamber and arranged at its other end to apply the pressure therein to the motor chamber, said passage thereby initially applying the pressure of the oil in said seal chamber to the oil in the motor chamber and being adapted to increase the pressure of the oil in the motor chamber when the pressure in said seal chamber is increased by leakage of said liquid into the seal chamber, and means in the lower end of said casing structure and interposed between the lowest part of said passage and said motor chamber comprising a trap above the lowest part of said passage of small cross-sectional area with respect to the cross-sectional area of said motor chamber and of extended length for at least substantially preventing the submerging liquid from entering said motor chamber from said passage.

15. A submergible motor comprising a vertically elongated casing structure having a motor chamber intermediate its ends closed to the exterior of the motor and adapted to be filled with oil and a seal chamber in the upper end of the casing structure, a stator and a rotor mounted in said motor chamber, a drive shaft extending from said motor chamber through said seal chamber, a seal about said shaft separating said chambers, a pressure transmitting tube extending vertically along the side of said casing structure and communicating at its upper end with said seal chamber, the lower end of said tube being connected to said casing structure below the motor chamber and being arranged to apply the pressure therein to the oil in the motor chamber at the lower end thereof, whereby the pressure in the motor chamber will be varied by pressure variations occurring in the seal chamber, and means in the lower part of said casing structure and interposed between the lowest part of said tube and said motor chamber and connected to the motor chamber, said means comprising a trap above the lowest part of said tube of small cross-sectional area with respect to the cross-sectional area of said motor chamber and of extended length for at least substantially preventing the submerging liquid from passing from the lower end of said tube into the motor chamber.

16. A submergible motor comprising a casing in the form of a cylinder shell having its axis vertical, a partition within the shell adjacent the lower end thereof, a cap structure at the upper end of the shell forming with said partition a motor chamber within the shell closed to the exterior of the motor and adapted to be filled with oil, said cap structure having a seal chamber therein, a stator and a rotor mounted within said motor chamber, a drive shaft extending from said motor chamber through said seal chamber, a seal about said shaft in said seal chamber for separating said chambers, pressure transmitting tube means extending vertically along the side of said shell and having its upper end connected to a passage in said cap structure extending from said seal chamber, the lower end of said tube means extending into said shell below said motor chamber for applying the pressure in said seal chamber to the oil in the motor chamber whereby the pressure in said motor chamber is at least equal to the pressure in the seal chamber, and means in the lower end of said casing and interposed between the lowest part of said tube means and said motor chamber and communicating with said motor chamber through a passage in said partition and comprising a trap above the lowest part of said tube means of small cross-sectional area with respect to the cross-sectional area of the motor chamber and of extended length for at least substantially preventing the submerging liquid from passing from said tube means into said motor chamber.

17. A submergible motor according to claim 12 and having a pressure relief valve extending from said seal chamber to the exterior of the motor for relieving pressure therein when the pressure in said seal chamber exceeds the pressure due to the depth of submergence of the motor.

18. A submergible motor according to claim 12 and having a pressure relief valve located substantially at the lower end of said seal chamber and extending to the exterior of the motor.

19. A submergible motor according to claim 12 and having a pair of seals mounted in the seal chamber about said shaft, one being mounted in the lower end of the seal chamber to separate the latter from the motor chamber and the other being mounted in the upper end of the seal chamber to separate the latter from the exterior of the motor, and a pressure relief valve located substantially at the lower end of said seal chamber and extending to the exterior of the motor whereby water leaking into said seal chamber through the last-mentioned seal will settle in the lower part of the seal chamber and be discharged through said relief valve by the expansion of the oil due to the heat of the motor when operating.

References Cited in the file of this patent

UNITED STATES PATENTS

| | | |
|---|---|---|
| 1,989,548 | Coberly et al. | Jan. 29, 1935 |
| 2,002,914 | Mendenhall et al. | May 28, 1935 |
| 2,002,915 | Mendenhall et al. | May 28, 1935 |
| 2,020,513 | Mendenhall et al. | Nov. 12, 1935 |
| 2,171,749 | Hollander et al. | Sept. 5, 1939 |
| 2,218,003 | Hawley | Oct. 15, 1940 |
| 2,305,648 | Van Horn | Dec. 22, 1942 |
| 2,446,521 | Blom | Aug. 10, 1948 |

FOREIGN PATENTS

| | | |
|---|---|---|
| 727,813 | Germany | Nov. 12, 1942 |